(12) United States Patent
Rhodes et al.

(10) Patent No.: US 7,561,070 B2
(45) Date of Patent: Jul. 14, 2009

(54) REMOVABLE ELECTRONIC TABLET FOR VEHICLE INSTRUMENT PANEL

(75) Inventors: Louis A Rhodes, Farmington Hills, MI (US); John C Mrozowski, Rochester, MI (US)

(73) Assignee: Chrysler LLC, Auburn Hills, MI (US)

( * ) Notice: Subject to any disclaimer, the term of this patent is extended or adjusted under 35 U.S.C. 154(b) by 242 days.

(21) Appl. No.: 11/343,035

(22) Filed: Jan. 30, 2006

(65) Prior Publication Data

US 2007/0176797 A1    Aug. 2, 2007

(51) Int. Cl.
*G08G 1/123* (2006.01)
*G01C 21/32* (2006.01)
*G01C 21/30* (2006.01)
*H04B 1/06* (2006.01)

(52) U.S. Cl. .............. 340/995.14; 340/995.26; 701/212; 455/346

(58) Field of Classification Search . 340/995.1–995.18, 340/932.2, 435–438, 456, 995.26, 995.27; 701/211–212, 300–302, 36, 41; 455/345, 455/346

See application file for complete search history.

(56) References Cited

U.S. PATENT DOCUMENTS

| 5,781,872 | A | * | 7/1998 | Konishi et al. ............... 701/36 |
| 6,148,261 | A |  | 11/2000 | Obradovich et al. ......... 701/208 |
| 6,320,517 | B1 | * | 11/2001 | Yano et al. ............. 340/995.15 |
| 6,441,872 | B1 | * | 8/2002 | Ho ............................. 348/837 |
| 6,663,010 | B2 | * | 12/2003 | Chene et al. .................. 236/51 |
| 6,812,860 | B1 |  | 11/2004 | Schwarzwalder, Jr. . 340/995.18 |
| 6,845,408 | B1 |  | 1/2005 | Lemke et al. ................ 710/18 |
| 6,952,155 | B2 | * | 10/2005 | Himmelstein .............. 340/5.52 |
| 7,349,722 | B2 | * | 3/2008 | Witkowski et al. ........ 455/569.2 |
| 2002/0032524 | A1 | * | 3/2002 | Hulverscheidt et al. ..... 701/211 |
| 2003/0080877 | A1 | * | 5/2003 | Takagi et al. ............ 340/932.2 |
| 2006/0020380 | A1 | * | 1/2006 | Saito et al. .................... 701/29 |
| 2006/0103513 | A1 | * | 5/2006 | Ihara et al. ................. 340/435 |
| 2006/0220923 | A1 | * | 10/2006 | Tanizaki et al. .......... 340/995.1 |

* cited by examiner

*Primary Examiner*—Jennifer Mehmood
(74) *Attorney, Agent, or Firm*—Ralph E. Smith

(57) ABSTRACT

An instrument panel for a vehicle that includes a screen that is operable to display at least one object, and wherein the object automatically changes in size when the vehicle changes between a drive mode and a park mode.

17 Claims, 2 Drawing Sheets

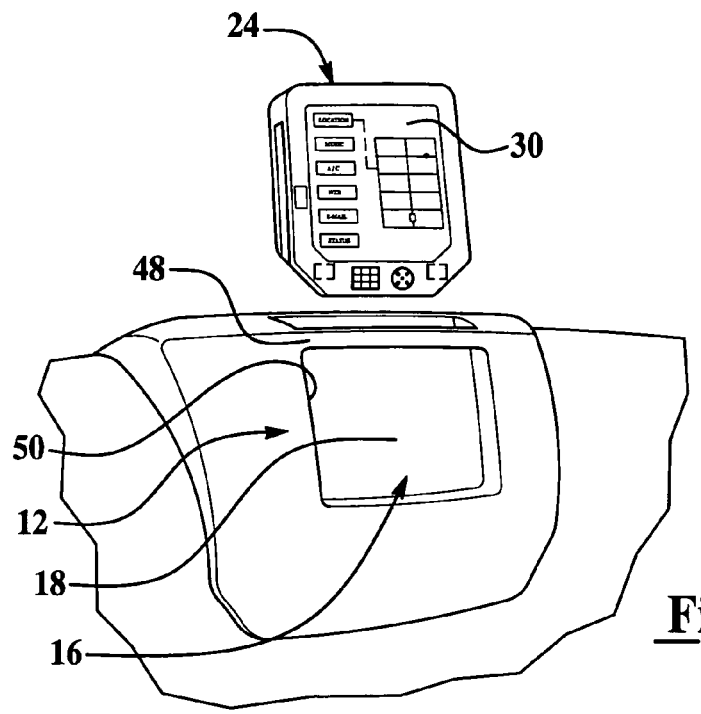
Figure 3
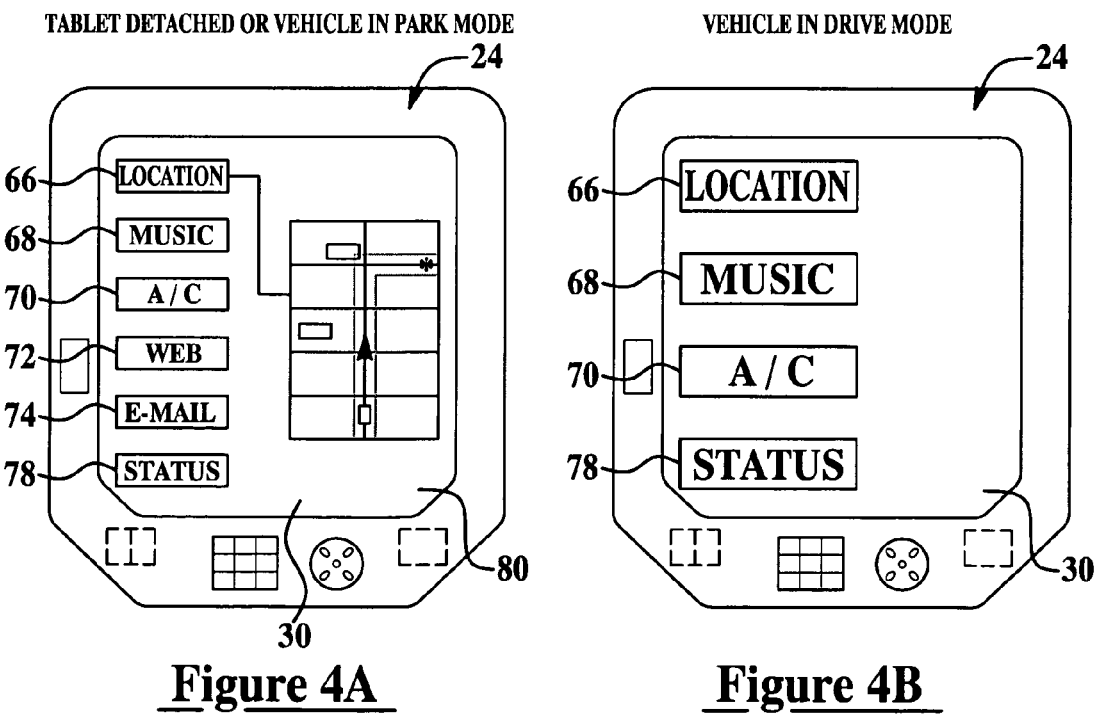
Figure 4A Figure 4B

US 7,561,070 B2

REMOVABLE ELECTRONIC TABLET FOR VEHICLE INSTRUMENT PANEL

FIELD

The present invention relates to an electronic tablet and, more particularly, relates to a removable electronic tablet for a vehicle instrument panel.

BACKGROUND

It is known to provide a vehicle with electronic devices that can be used for providing information to the vehicle occupants. The electronic devices often include a screen for displaying information, such as maps, geographic information, and the like. Some of the electronic devices are removably attached to the vehicle for use both inside and outside the vehicle for improved versatility.

However, the size of the objects on the screen may not be suitable for all conditions. For instance, text can be displayed large enough to be easily read while driving. However, when the vehicle is parked or when the device is used separate from the vehicle, the larger text size may limit the amount of information that can be displayed on the screen. On the other hand, objects can be displayed smaller to fit more information on the screen, but the objects may be too small for a driver to see while driving.

With many of these electronic devices, a user can manually change the size of the objects displayed on the screen. However, manually changing the size can be inconvenient. Accordingly, there remains a need in the art for an electronic device that can be removably and operably connected to a vehicle, wherein the size of the objects displayed on the screen changes automatically depending on how the device is being used.

SUMMARY

An instrument panel for a vehicle is provided according to a first aspect of the present invention including a screen that is operable to display at least one object, and wherein the object automatically changes in size when the vehicle changes between a drive mode and a park mode.

According to a second aspect of the present invention an electronic tablet for a vehicle is provided including a housing that can be removably supported by the vehicle. The tablet also includes a screen that is operable to display at least one object. The object automatically changes in size when the vehicle changes between a drive mode and a park mode.

According to a third aspect of the present invention a vehicle is provided including a support member and an electronic tablet that is removably supported by the support member. The electronic tablet includes a touch sensitive screen with which a user can provide input for controlling at least one vehicle system. The screen is operable to display at least one object. The object automatically changes in size when the vehicle changes between a drive mode and a park mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present disclosure will become more fully understood from the detailed description and the accompanying drawings, wherein:

FIG. 3 is an exploded perspective view of another embodiment of the instrument panel according to an exemplary embodiment of the present invention;

FIG. 4A is a plan view of the electronic tablet shown either when the vehicle is in park mode or when the electronic tablet is being used separate from the vehicle according to an exemplary embodiment of the present invention; and FIG. 4B is a plan view of the electronic tablet shown when the vehicle is in drive mode according to an exemplary embodiment of the present invention.

DETAILED DESCRIPTION

The following description is merely exemplary in nature and is in no way intended to limit the invention, its application, or uses.

Figure 1:
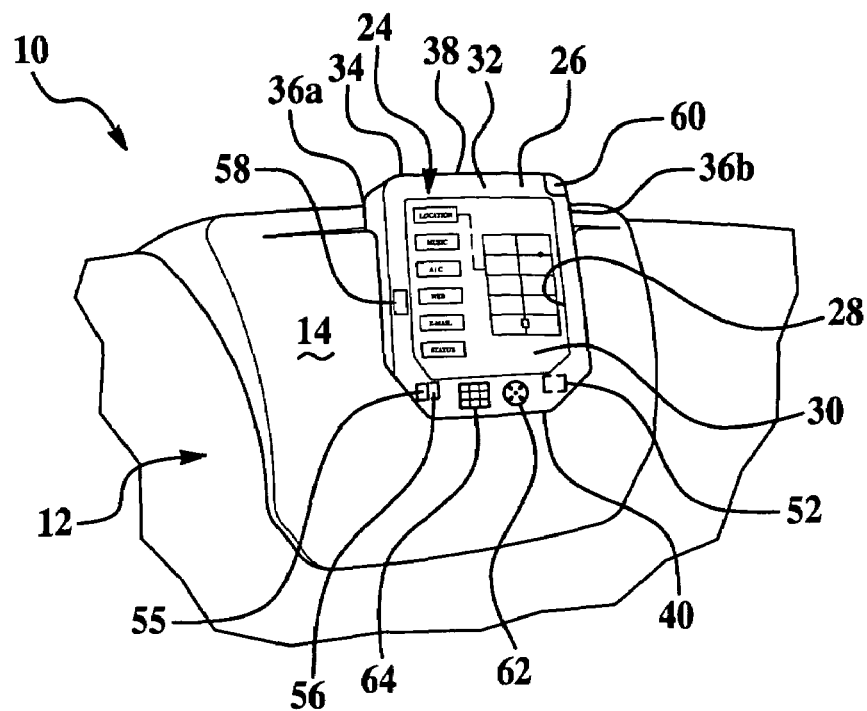
FIG. 1 is a perspective view of an instrument panel of a vehicle including an electronic tablet according to an exemplary embodiment of the present invention.
Figure 2:
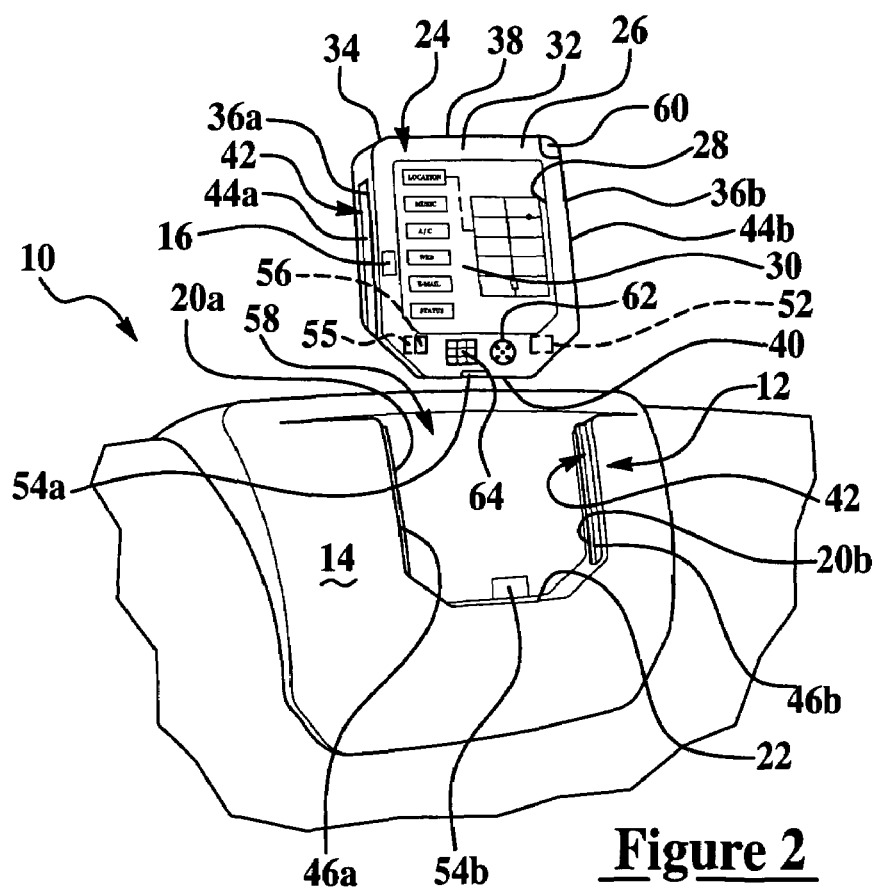
FIG. 2 is an exploded perspective view of the instrument panel of FIG. 1 according to an exemplary embodiment of the present invention.

Referring now to FIGS. 1 and 2, a vehicle 10 is illustrated. Specifically, an instrument panel 12 of the vehicle 10 is shown. The instrument panel 12 includes a front surface 14. The front surface 14 defines a support member generally indicated at 16 in FIG. 2. In the embodiment shown, the support member 16 is recessed within the front surface 14 of the instrument panel 12. More specifically, the support member 16 includes a back wall 18, side walls 20a, 20b and bottom wall 22.

The instrument panel 12 also includes an electronic tablet 24. The electronic tablet 24 includes a housing 26 that encapsulates various electronic components for operating the electronic tablet 24. The housing 26 also includes an opening 28, and the electronic tablet 24 includes a screen 30 that is disposed within the opening 28. As will be discussed in greater detail below, objects shown on the screen vary depending on whether the vehicle 10 is in a drive mode or a park mode.

The housing 26 of the electronic tablet 24 is adapted to fit within the support member 16 of the vehicle 10. As such, the housing 26 includes a front surface 32, a back surface 34, side surfaces 36a, 36b, a top surface 38 and a bottom surface 40. The housing 26 is made out of a durable material, and energy absorbing members can be attached to the housing 26. Also, in one embodiment, the housing 26 is water resistant.

The electronic tablet 24 is removably supported by the support member 16 of the vehicle 10. In the embodiment shown, the electronic tablet 24 slides into and out of the support member 16 such that the side surfaces 36a, 36b of the housing 26 of the electronic tablet 24 mate against the side walls 20a, 20b of the support member 16, respectively.

As shown in FIG. 2, the instrument panel 12 further includes a retention member 42, which is operable to retain the electronic tablet 24 in the support member 16. For instance, in the embodiment shown, the retention member 42 includes a groove 44a, 44b included on both side surfaces 36a, 36b of the electronic tablet 24. The retention member 42 further includes a tongue member 46a, 46b extending from the side walls 20a, 20b of the support member 16. Those having ordinary skill in the art will appreciate that the groove 44a, 44b could be included on the support member 16, and the tongue member 46a, 46b could be included on the electronic tablet 24 without departing from the scope of the present disclosure. Thus, as the electronic tablet 24 slides into the support member 16, the tongue members 46a, 46b extend into the corresponding grooves 44a, 44b to thereby retain the electronic tablet 24 in the support member 16. As such, the electronic tablet 24 is unlikely to inadvertently fall from the support member 16, even during high accelerations of the vehicle 10. Those having ordinary skill in the art will appreciate that the retention member 42 could be of any suitable type other than the tongue member 46a, 46b and groove 44a, 44b combination. For instance, the retention member 42 could also be a fastener such as pile tape or magnetic holders. The electronic tablet 24 could also frictionally fit within the support member 16.

In another embodiment shown in FIG. 3, the support member 16 includes a front wall 48 that is substantially parallel and spaced from the back wall 18 of the support member 16. The front wall 48 also includes an opening 50. The opening 50 is disposed such that the screen 30 of the electronic tablet 24 can be seen through the opening 50 when the electronic tablet 24 is supported within the support member 16. As such, the electronic tablet 24 is substantially enclosed within the support member 16 and is retained therein.

In the embodiment shown, the front surface 32 of the electronic tablet 24 is curved so as to be continuous with the front surface 14 of the instrument panel 12. Also, as shown in FIG. 1 the top surface 38 of the tablet 24 is disposed higher than the support member 16 such that the electronic tablet 24 extends upward and outward from the support member 16. However, those having ordinary skill in the art will appreciate that the housing 26 of the electronic tablet 24 and the front surface 14 of the instrument panel 12 could be of any suitable shape without departing from the scope of the present disclosure.

The electronic tablet 24 also includes a plurality of features that allow the electronic tablet 24 to function independent of the vehicle 10 or to function in cooperation with the vehicle 10. For instance, the electronic tablet 24 includes an internal battery 52 that can be used to power the electronic tablet 24. The electronic tablet 24 also includes a memory storage device 55, such as a memory chip, a hard drive, and the like. The electronic tablet 24 can also include a disk drive, a CD-ROM drive, and/or a DVD drive. The electronic tablet 24 further includes a microprocessor 56.

The electronic tablet 24 also includes at least one data transfer device schematically represented at 58. The data transfer device 58 can be used to transfer data to or from the electronic tablet 24. Those having ordinary skill in the art will appreciate that the one or more data transfer devices 58 could be of any suitable type. For instance, the data transfer device 58 could be a USB 2.0 port, an IEEE firewire port, a LAN interface, and/or a WLAN interface.

The electronic-tablet 24 also includes a data transfer device in the form of a global positioning interface 60. The global positioning interface 60 can be used to transmit and receive global position data to and from global positioning satellites or other global positioning system to thereby locate the electronic tablet 24.

The electronic tablet 24 further includes a microphone 62 for providing sound input to the electronic tablet 24. Also, the electronic tablet 24 includes at least one speaker 64 for providing sound output from the electronic tablet 24.

As shown in FIG. 2, the electronic tablet 24 also includes a vehicle-tablet interface 54a, and a corresponding vehicle-tablet interface 54b is included within the support member 16. The vehicle-tablet interface 54a, 54b can be a connector of any suitable type that allows for data transfer between the vehicle 10 and the tablet 24. As such, when the electronic tablet 24 is inserted into the support member 16, the vehicle-tablet interface 54a, 54b makes contact to establish electrical communication between the electronic tablet 24 and the vehicle 20. Thus, power can be supplied from the battery of the vehicle 10 to recharge the internal battery 52 of the electronic tablet 24. Also, input signals can be transmitted from the electronic tablet 24 through the vehicle-tablet interface 54a, 54b to the computer (not shown) of the vehicle 10, to thereby control at least one vehicle system as will be discussed in greater detail below. Furthermore, input signals can be transmitted from the computer of the vehicle 10 through the vehicle-tablet interface 54a, 54b to the electronic tablet 24.

In one embodiment, the screen 30 of the electronic tablet 24 is a touch sensitive screen. Accordingly, the screen 30 can display information to the user, and the user can provide input by touching the screen 30 with a finger, a stylus, or other suitable object. The screen 30 can employ any suitable touch sensitive technology without departing from the scope of the present disclosure. In one embodiment, the screen 30 includes a film that reduces glare. The film also directs light emitted from the screen 30, such as to reduce reflection of the light emitted from the screen 30 off of the windshield of the vehicle 10. The film can also to enhance the brightness of light emitted from the screen 30. In one embodiment, the film included on the screen 30 is a VIKUITI display enhancement film, a VIKUITI brightness enhancement film, or a VIKUITI reflective polarizer brightness enhancement film.

Accordingly, the electronic tablet 24 can be used for personal computing needs, either when attached or detached from the vehicle 10. The data transfer device 58 can allow for internet communication. Also, software can be loaded on the electronic tablet 24 using the data transfer device 58 to enhance the capability of the tablet 24.

The global positioning interface 60 allows a user to identify the current global position. The electronic tablet 24 can also link to a map database either stored in memory or obtained from an external source to display other geographic information. For instance, the electronic tablet 24 can be used to display navigation information to thereby explain how to get to a desired destination. The electronic tablet 24 might also be particularly useful for a driver or delivery person because the tablet 24 can communicate with a remote database to track deliveries, locate delivery destinations, and the like.

Also, when the electronic tablet 24 is operatively connected to the vehicle 10, the electronic tablet 24 can be used to provide input to the vehicle 10 and control at least one system of the vehicle 10. For instance, the electronic tablet 24 can be used to control the air conditioning system of the vehicle, the stereo system of the vehicle, and the like. The screen 30 displays one or more objects that correspond to these vehicle systems as shown in FIGS. 4A and 4B. A user touches the object displayed on the screen 30 to control the corresponding vehicle system. When touched, a signal is sent from the tablet 24, through the vehicle-tablet interface 54a, 54b, and to the vehicle 10 computer to ultimately control the vehicle system. Those having ordinary skill in the art will appreciate that the screen 30 could display any suitable object and any number of objects without departing from the scope of the present invention.

In the embodiment shown in FIG. 4A, the screen 30 includes a plurality of touch-sensitive "buttons" including a location button 66, a music button 68, a air conditioning button 70, a web button 72, an e-mail button 74, and a status button 78. To initiate any of the functions of the electronic tablet 24, a user taps on the screen 30 on any one of the buttons 66, 68, 70, 72, 74, 78.

As shown in FIG. 4A, the location button 66 has been tapped, which causes a map 80 to be displayed on the screen 30. The map 80 includes the user's current location, an arrow to signify the direction of movement of the user, and a destination point signified by a star in FIG. 4A. The map 80 also displays lodging, restaurants, points of interest, and other information. The map 80 can be customizable to display only what the user desires. The map 80 can be interactive and automatic such that the map 80 updates automatically according to the changing location of the vehicle. Tapping the location button 66 could also cause textual directions to display on the screen in addition to or as an alternative to the map 80. When the electronic tablet 24 is connected to the vehicle 10, a user can press the music button 68 to control the stereo system of the vehicle. In one embodiment, the electronic tablet 24 stores music on the memory storage device 54, and the music stored thereon can be played through the stereo system of the vehicle 10. To control the air conditioning of the vehicle 10, a user presses the A/C button and a menu pops up for the control of the vehicle's air conditioning system. To access the worldwide web, a user taps the web button. To access e-mail systems, a user taps the e-mail button 74. To use the tracking system, a user taps the tracking button 76. To check the status of the vehicle such as the coolant temperature, the voltage of the vehicle battery, and the like, the user taps the status button 78, and a menu pops up to access the vehicle data.

It will be appreciated that FIG. 4A represents the tablet 24 either operating detached from the vehicle 10 or operating attached to the vehicle 10 when in park mode. FIG. 4B represents the tablet 24 operating attached to the vehicle 10 when in drive mode. It should be appreciated that park mode means that the vehicle 10 is stationary, for whatever reason. It should also be appreciated that drive mode means that the vehicle 10 is moving, either forward or in reverse.

A comparison of FIG. 4A and FIG. 4B shows that the objects displayed on the screen 30 change in size when the vehicle 10 changes between a drive mode and a park mode. In the embodiment shown, the objects increase in size when the vehicle changes from the park mode (FIG. 4A) to the drive mode (FIG. 4B). As such vehicle occupants, such as the driver, can more easily read and detect the displayed objects and is less likely to be distracted when the vehicle 10 is moving.

More specifically, as shown in FIG. 4A, if the electronic tablet 24 is detached from the vehicle 10 or if the tablet 24 is attached to a parked vehicle, the screen 30 displays smaller objects to fit more information onto the screen 30. In contrast, as shown in FIG. 4B, the objects, namely the location button 66, the music button 68, the air conditioning button 70, and the status button 78 automatically get bigger when the vehicle 10 changes from the park mode to the drive mode. It should be appreciated that the map 80 and other objects could get bigger when the vehicle 10 changes from park mode to drive mode. It should also be appreciated that the size of the objects could reduce as the vehicle 10 changes from the drive mode to the park mode.

A comparison of FIG. 4A and FIG. 4B also shows that the number of objects displayed on the screen 30 reduces as the vehicle 10 moves from the park mode to the drive mode. As such, the vehicle occupants, such as the driver, are less likely to be distracted by unnecessary functions of the tablet 24 while the vehicle 10 is moving.

More specifically, as shown in FIG. 4A (park mode), the screen 30 displays the location button 66, the music button 68, the A/C button 70, the web button 72, the e-mail button 74, and the status button 78. However, as shown in FIG. 4B (drive mode), only the location button 66, the music button 68, the A/C button 70, and the status button 78 are shown. As such, the electronic tablet 24 automatically reduces the number of objects displayed on the screen 30 when the vehicle 10 is moving. Accordingly, the driver of the vehicle 10 is less likely to be distracted by the object shown on the screen. Also, the driver can more easily read the objects shown on the screen 30 because the screen 30 will be less cluttered.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An instrument panel for a vehicle, wherein the instrument panel is adapted to detachably support and operatively connect to a portable electronic device having a display screen such that the screen is viewable from a position within the vehicle, the device displaying at least one object selected from a first group of objects when the device is detached from the instrument panel, and the device displaying at least one object selected from the group consisting of the first group of objects and a second group of objects when the device is supported by and operatively connected to the instrument panel, the first group of objects including at least one of geographic information, email, internet-based information, and audio-visual information, and the second group of objects including current vehicle data, historical vehicle data, and current vehicle system information, wherein the relative size of displayed objects is increased when the device is operatively connected to the instrument panel and the vehicle is moving, and wherein the size of one object from the first group of objects, displayed when the device is disconnected from the instrument panel, remains relatively unchanged when the device is subsequently connected to the instrument panel and the vehicle is not moving.

2. The instrument panel of claim 1, wherein the device is further adapted to accept an input from a vehicle passenger when the device is operatively connected to the instrument panel, the input controlling a vehicle system corresponding to a displayed object.

3. The instrument panel of claim 2, wherein the screen is a touch-sensitive screen.

4. The instrument panel of claim 2, wherein current vehicle system information corresponds to one of the group consisting of a vehicle heating and air conditioning system, a vehicle audio system, and vehicle tracking system, and a vehicle navigation system.

5. The instrument panel of claim 1, wherein the device has a front surface including the screen, and wherein the front surface is curved so as to be continuous with a front surface of the instrument panel when the device is supported by the instrument panel.

6. A portable electronic device having a display screen, the device being adapted to be detachably supported by and operatively connected to an instrument panel of a vehicle such that the screen is viewable from a position within the vehicle, wherein the device displays at least one object selected from a first group of objects when the device is not operatively connected to the vehicle, the first group of objects including at least one of geographic information, email, internet-based information, and audio-visual information, wherein the device displays at least one object selected from the group consisting of the first group of objects and a second group of objects when the device is operatively connected to the instrument panel, the second group of objects including current vehicle data, historical vehicle data, and current vehicle system information, and wherein the relative size of one of the displayed objects is increased when the device is operatively connected to the instrument panel and the vehicle is moving, and wherein the size of one object from the first group of objects, displayed when the device is disconnected from the instrument panel, remains relatively unchanged when the device is connected to the instrument panel and the vehicle is not moving.

7. The device of claim 6, wherein the screen is a touch sensitive screen.

8. The device of claim 6, further comprising at least one data transfer devices, the at least one date transfer device chosen from a group consisting of a USB 2.0 port, an IEEE Firewire port, a LAN interface, a WLAN interface, and a global positioning interface.

9. The device of claim 6, further comprising a microphone, and wherein the device is operable to receive sound input via the microphone for controlling the vehicle.

10. The device of claim 6, wherein the device includes at least one speaker.

11. The device of claim 6, wherein the device is further adapted to accept an input from a vehicle passenger when the device is operatively connected to the instrument panel, wherein the input controls a vehicle system corresponding to a displayed object.

12. The device of claim 11, wherein current vehicle system information corresponds to one of the group consisting of a vehicle heating and air conditioning system, a vehicle audio system, and vehicle tracking system, and a vehicle navigation system.

13. A vehicle comprising:
a portable electronic device having a display screen, and
an instrument panel adapted to house the device such that the device is operatively connected to the vehicle and the screen of the device is viewable from a position within the vehicle, wherein the device displays at least one object selected from a first group of objects when the device is not operatively connected to the vehicle, the first group of objects including at least one of geographic information, email, internet-based information, and audio-visual information, wherein the device displays at least one object selected from the group consisting of the first group of objects and a second group of objects when the device is operatively connected to the vehicle, the second group of objects including current vehicle data, historical vehicle data, and current vehicle system information, wherein the relative size of displayed objects is increased when the device is operatively connected to the vehicle and the vehicle is moving, and wherein the size of one object from the first group of objects, displayed when the device is disconnected from the instrument panel, remains relatively unchanged when the device is subsequently connected to the vehicle and the vehicle is not moving.

14. The instrument panel of claim 13, wherein the device is further adapted to accept an input from a vehicle passenger when the device is operatively connected to the vehicle, the input controlling a vehicle system corresponding to a displayed object.

15. The instrument panel of claim 14, wherein the screen is a touch-sensitive screen.

16. The instrument panel of claim 14, wherein current vehicle system information corresponds to one of the group consisting of a vehicle heating and air conditioning system, a vehicle audio system, and vehicle tracking system, and a vehicle navigation system.

17. The instrument panel of claim 13, wherein the device has a front surface including the screen, and wherein the front surface is curved so as to be continuous with a front surface of the instrument panel when the device is supported by the instrument panel.

* * * * *